United States Patent

[11] 3,629,682

[72] Inventor  Donald A. Boelter
             Indianapolis, Ind.
[21] Appl. No. 18,416
[22] Filed    Mar. 11, 1970
[45] Patented Dec. 21, 1971
[73] Assignee General Aviation Electronics, Inc.
             Indianapolis, Ind.

[54] INVERTER WITH ZENER-REGULATED OUTPUT FREQUENCY AND VOLTAGE
4 Claims, 3 Drawing Figs.

[52] U.S. Cl. .................................................. 321/2,
                                              321/18, 331/113 A
[51] Int. Cl. ........................................ H02m 7/52,
                                                     H03k 3/28
[50] Field of Search ................................. 321/2, 18;
                                                      331/113.1

[56]         References Cited
         UNITED STATES PATENTS
3,551,845  12/1970  Zelina ........................... 321/2 X
3,192,464  6/1965   Johnson et al. ................   321/2
3,335,316  8/1967   Schneider ....................... 321/2 X
3,387,229  6/1968   Corey ........................... 331/113.1

FOREIGN PATENTS
242,983  5/1969  U.S.S.R. ........................ 321/2
       OTHER REFERENCES
Electronics World, " High Efficiency DC— DC Converter,"
pp. 35-37, Feb. 1969.

Primary Examiner—William H. Beha, Jr.
Attorney—Woodard, Weikart, Emhardt & Naughton ABSTRACT: A solid-state power supply for transforming unregulated direct current electrical energy into regulated alternating current and/or direct current electrical energy. The power supply has a common collector, DC to AC inverter with a circuit for limiting the excursion of the inverter drive voltage to prevent saturation of the common collector power transistors. The power transistors in the inverter function simultaneously as power oscillators and as series regulators. A shunt regulator is connected to a pair of diodes which in turn are connected to the power transistors for controlling the excursion of the base drive voltage. The inverter is connected to a transformer which provides one or more regulated AC outputs. Rectifier-filter circuits may be connected to the output of the transformer to provide regulated direct current electrical energy. A feedback network is connected from the output of the inverter to the shunt regulator to control the limiting voltage of the shunt regulator.

INVENTOR
Donald A. Boelter
BY
Woodard, Weikart, Emhardt & Naughton
ATTORNEYS

INVENTOR
DONALD A. BOELTER
BY
Woodard, Weikart, Emhardt & Naughton
ATTORNEYS 3,629,682

AN INVERTER WITH ZONER-REGULATED OUTPUT FREQUENCY AND VOLTAGE

BACKGROUND OF THE INVENTION

1. Field of the Invention

This invention relates to an electrical power supply having power transistors which simultaneously function as series regulators and as power oscillators.

2. Description of the Prior Art

A number of solid-state power supplies have been developed in recent years. Generally the DC to AC power supplies contain a standard saturated inverter circuit for converting the input DC electrical energy into AC electrical energy. These inverter circuits employ saturated power transistors which act as oscillators to change the DC electrical energy into AC electrical energy. The net result of utilizing saturated transistors is a low current gain, switching speed and circuit efficiency.

The inverter circuit is generally supplied regulated voltage by a separate series regulator circuit having at least one high-power transistor. The high-power transistor is very expensive and greatly increases the heat-sinking requirement.

From the above background it can be concluded that there is a need for an inverter circuit which operates in a nonsaturated mode. In addition, it is desirable for the inverter circuit to receive regulated voltage from a circuit based on a component other than a high-power transistor. These needs can be fulfilled by an inverter circuit having nonsaturated oscillator transistors which simultaneously function as regulator transistors. Thus, such a circuit would not require a separate series regulator circuit.

The present invention provides a power supply having an inverter which is controlled by a shunt regulator circuit in lieu of the series regulator circuit. The oscillator transistors utilized in the inverter are operated in a nonsaturated mode providing a higher usable current gain, switching speed and circuit efficiency. The oscillator transistors simultaneously function as regulator transistors.

SUMMARY OF THE INVENTION

The present invention is a power supply which transforms unregulated direct current electrical energy into regulated direct current and/or alternating current electrical energy. The power supply has an inverter controlled by a shunt regulator in such a manner that the inverter transistors act simultaneously as regulators and as power oscillators. The inverter transistors are connected in a common collector arrangement having their bases connected to the shunt regulator via a pair of diodes. The emitters of the inverter transistors are connected across a first primary transformer winding while the bases of the inverter transistors are connected across a second primary transformer winding. Feedback is provided to the shunt regulator. Regulated alternating current electrical energy is provided by the output terminals of the secondary transformer winding. Rectifier-filter circuits are connected to the secondary winding of the transformer in order to provide regulated direct current electrical energy.

It is one object of this invention to provide a power supply having inverter transistors which operate simultaneously as series regulators and as power oscillators.

Another object of this invention is to provide a power supply having inverter transistors connected to a shunt regulator in such a manner that the excursion base voltages of the inverter transistors are controlled by the shunt regulator.

A further object of this invention is to provide a power supply having inverter transistors operating in a nonsaturated mode allowing a high usable current gain, switching speed and efficiency.

Related objects and advantages will be apparent from the drawings, claims and the portion of the specification which follows.

DESCRIPTION OF THE PREFERRED EMBODIMENT

The present invention is a unique method and device for generating one or more regulated AC or DC voltages. An embodiment of the invention is a common collector DC to AC inverter connected to a circuit for limiting the excursion of the inverter base drive voltage. As a result, the inverter power transistors are prevented from saturating. The inverter transistors function simultaneously as power oscillators and as series regulators providing a voltage-regulated drive to the inverter transformer. The transformer provides one or more regulated AC output voltages. The transformer outputs may be rectified and filtered to provide regulated DC voltages.

Figure 1:
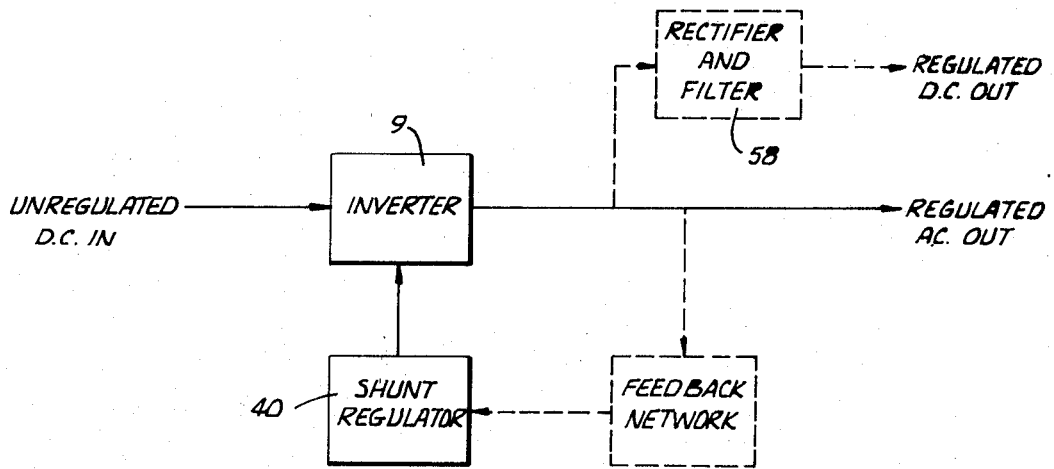
FIG. 1 is a general block diagram of a power supply incorporating the present invention.

Referring now more particularly to FIG. 1, there is illustrated an inverter 9 having an input for receiving unregulated direct current electrical energy and an output for conveying regulated alternating current electrical energy. A shunt regulator 40 is shown connected to inverter 9 for limiting the drive voltage of inverter 9. Optional circuits are shown by dashed lines and dashed blocks. A feedback network may be connected between the inverter output and the input of shunt regulator 40 for applying the rectified inverter output energy to control the limiting voltage of regulator 40. Rectifier-filter circuits 58 may be connected to the inverter output to provide regulated direct current electrical energy.

Figure 2:
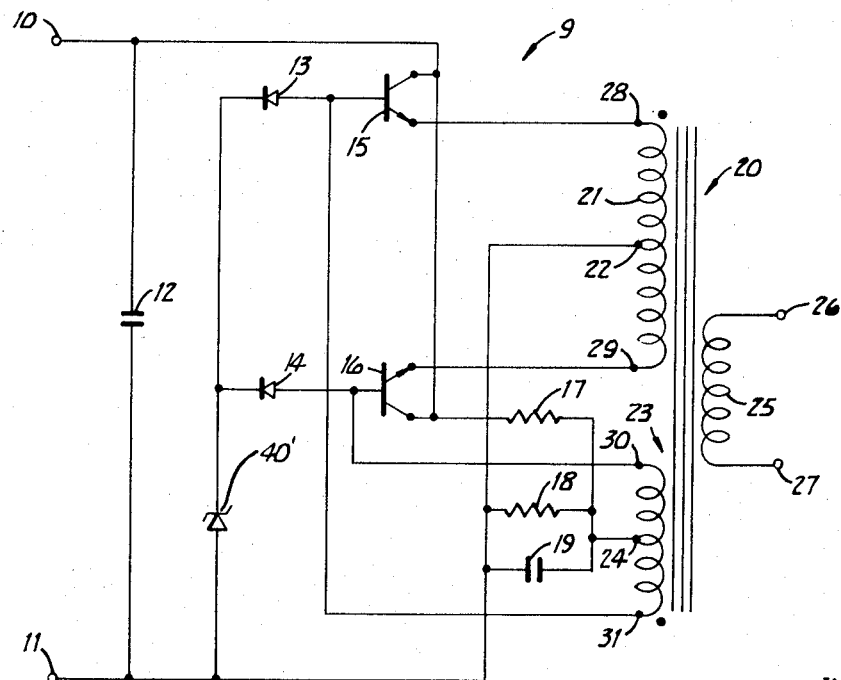
FIG. 2 is a detailed schematic representation of the inverter shown in FIG. 1.

FIG. 2 is a detailed schematic representation of the components used for inverter 9 shown in FIG. 1. Inverter 9 receives unregulated direct current electrical energy from input terminals 10 and 11. Connected to terminals 10 and 11 is capacitor 12 for providing a low source impedance to increase the switching speeds and efficiency of the circuit. In addition, terminal 10 is connected to the collectors of transistors 15 and 16. Transistor 15 has its base connected to the anode of diode 13 and to terminal 31 of the second primary winding 23 of transformer 20. Transistor 16 has its base connected to the anode of diode 14 and to terminal 30 of second primary winding 23 of transformer 20. The cathodes of diodes 13 and 14 are connected together to zener diode 40 which in turn is connected to terminal 11. The emitters of transistors 15 and 16 are connected respectively to terminals 28 and 29 of first primary winding 21 of transformer 20. Terminal 10 is connected to the collectors of transistors 15 and 16 and to resistor 17 which is connected to the center tap terminal 24 of second primary winding 23 of transformer 20. Resistor 18 and capacitor 19 are connected in parallel between terminal 11 and center tap terminal 24. In addition, the center tap terminal 22 of first primary winding 21 of transformer 20 is connected to terminal 11.

Transistors 15 and 16 are NPN-oscillator transistors connected in the common collector or emitter follower arrangement and will typically be medium- or high-power transistors. The starting bias for transistors 15 and 16 is provided by resistors 17 and 18. Capacitor 19 provides a low feedback impedance to increase the switching speed and efficiency of the circuit.

As is well known, the emitter voltage of a junction transistor may be regulated by controlling the base voltage. This is true since the emitter voltage of a junction transistor operated in a linear mode remains within 0.7±0.2 volts of the base voltage over an extremely wide range of emitter current. Zener diode 40 limits the excursion of the base drive voltages of transistors 15 and 16 while diodes 13 and 14 provide the proper offset voltage to the transistor bases to insure that the emitter voltages equal the voltage determined by the shunt regulator. Diodes 13 and 14 also provide temperature compensation for the base-emitter junctions. The shunt regulator may be a single-zener diode or as complex as utilizing the rectified output of the inverter to control the limiting voltage of the shunt regulator as will be described later.

The operation of the circuit of FIG. 2 will now be described. A DC voltage is applied through terminals 10 and 11 to the biasing resistors 17 and 18 applying base voltage to transistors 15 and 16. Transistors 15 and 16 will both turn on; however, the transistors are chosen so one will conduct more heavily than the other. For example, as transistor 15 first conducts more heavily than transistor 16, then the voltage at terminal 28 begins to increase positively causing the voltage at terminal 30 to go negative turning transistor 16 off. As the voltage at terminal 30 increases negatively, then the voltage at terminal 31 goes positive thereby driving transistor 15 harder. The voltage at terminals 28 and 31 continue to rise until the voltage at terminal 31 equals the zener voltage of zener 40' plus the forward voltage drop of diode 13. The base voltage of transistor 15 is then clamped. The emitter voltage of transistor 15 is then also fixed as is the voltage at terminal 28. Zener diode 40' is chosen so that the voltage at terminal 28 is less than the input DC voltage. The voltage at terminal 28 remains constant until the core of transformer 20 becomes magnetically saturated. The voltage at terminal 31 then drops towards zero point and the voltage at terminal 30 increases from a negative value to a positive value, transistor 16 will then turn on with the transistor 15 turning off. Diode 14 will then conduct and clamp the base voltage of transistor 16. The cycle is repeated so as to alternatively turn transistors 15 and 16 off and on. Capacitor 19 increases the switching speed. The number of transformer turns on coil 21 as well as the core material of the transformer and the zener voltage determines the frequency of the output signal. The amplitude of oscillation is not controlled by the transformer. The zener voltage regulates not only the output frequency but also the output voltage.

Transformer 20 has a first primary winding 21, a second primary winding 23 and a secondary winding 25 with output terminals 26 and 27 connected across the secondary winding. Transformer 20 may also have multiple secondary windings depending upon the output voltages required. The transformer output may be rectified and filtered to provide regulated direct current electrical energy.

Examples of components which have been successfully employed in the inverter circuit of FIG. 2 are as follows:

| | |
|---|---|
| Capacitor 12 | 640 μF |
| Capacitor 19 | 2.5 μF |
| Diodes 13 & 14 | 1 amp, 50 volt |
| Transistors 15 & 16 | 40363 |
| Resistor 17 | 330 ohms |
| Resistor 18 | 22 ohms |
| Shunt Regulator 40 | IN 4740 zener diode |

Figure 3:
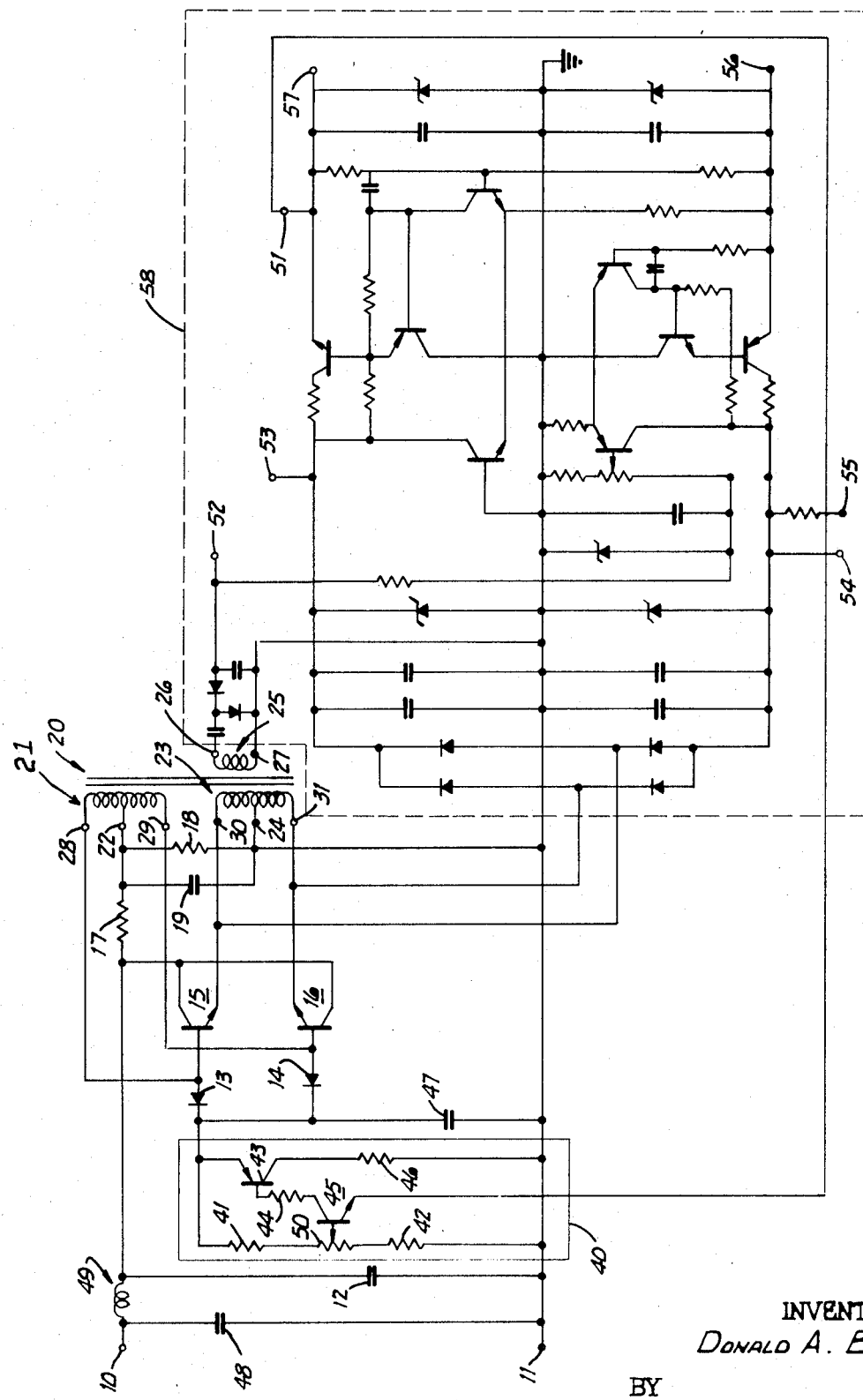
FIG. 3 is a detailed schematic representation of a power supply based on the present invention.

FIG. 3 shows, in addition to the inverter shown in FIG. 2, typical components for shunt regulator 40 as well as typical circuits for rectifying and filtering the output of transformer 20. As previously described, shunt regulator 40 is connected to the cathodes of diodes 13 and 14. Shunt regulator 40 could be a single-zener diode with its anode connected to terminal 11 and its cathode connected to the cathodes of diodes 13 and 14. An alternate circuit for the shunt regulator is shown in FIG. 3. The cathodes of diodes 13 and 14 are connected together to the emitter of PNP-transistor 43 which has its base connected to resistor 44. Resistor 44 in turn is connected to the collector of NPN-transistor 45 which has its base connected to variable resistor 50. The collector of transistor 43 is connected across resistor 46 to terminal 11. The emitter of transistor 43 is connected across resistor 41, which is in series with variable resistor 50 and resistor 42, to terminal 11. The emitter of transistor 45 is connected to terminal 51 in order that the rectified output of the inverter may be used to control the limiting voltage of the shunt regulator. Capacitor 47 is connected between terminal 11 and the cathodes of diodes 13 and 14. Inductor 49 and capacitors 12 and 48 are connected between the collector of transistors 15 and 16 and input terminals 10 and 11.

Examples of components which have been successfully employed in the shunt regulator shown in FIG. 3 are as follows:

| | |
|---|---|
| Capacitor 47 | 250 μF |
| Capacitor 12 | 640 μF |
| Inductor 49 | 50 μH |
| Resistors 41 & 42 | 2.2 K ohms |
| Resistor 44 | 1 K ohms |
| Resistor 46 | 82 ohms |
| Variable Resistor 50 | 1 K ohms |
| Transistor 43 | 2N3638 |
| Transistor 45 | SE4001 |

Also shown in FIG. 3 are the various rectifier-filter circuits 58 connected to the output terminals 26 and 27 of the secondary winding 25 and terminals 30 and 31 of primary winding 23 of transformer 20. Rectifier-filter circuits 58 are standard circuits, several of which are depicted in FIG. 3 for providing regulated direct current electrical energy. Terminals 52 through 57 are connected at various points throughout circuit 58 to provide various positive and negative output voltages. The rectifier-filter circuits will not be described, it being understood that the circuits are obvious to one skilled in the art.

It will be evident from the above description that the present invention provides a method and apparatus for using inverter transistors in a power supply simultaneously as power regulator transistors and oscillator transistors. It will also be evident from the above description that the present invention provides a method and apparatus for using oscillator transistors in a nonsaturated mode resulting in a much higher usable current gain, switching speed and circuit efficiency.

While the invention has been illustrated and described in detail in the drawings and foregoing description, the same is to be considered as illustrative and not restricted in character, it being understood that only the preferred embodiment has been shown and described and that all changes and modifications which come within the spirit of the invention are desired to be protected. Thus, the invention is not intended to encompass only specific circuits as illustrated, but the method of using the oscillator transistors simultaneously as power regulator transistors.

The invention claimed is:

1. A solid-state power supply for converting unregulated direct current electrical energy into regulated electrical energy comprising:
   a transformer with a pair of primary windings;
   a pair of nonsaturating transistors having load paths connected together across one of said windings and bases connected together across the other of said windings;
   a zener diode with a first end connected to a common ground and with an opposite end; and,
   a pair of diodes having second ends connected together to said opposite end of said zener diode and third ends connected directly to said bases, said diodes limiting the maximum drive voltage of said bases to a voltage provided by said zener diode.

2. The power supply of claim 1 wherein:
   said transformer has a maximum of two primary windings; and,
   said transistors have emitters connected together across one of said primary windings and collectors connected directly together, said bases are connected across the other of said primary windings.

3. The power supply of claim 2 wherein:
   said primary windings have center tap terminals connected together through a first resistor and capacitor connected together in parallel arrangement; and further comprising:
   a second resistor connected between said collectors and said center tap terminal of one of said primary windings.

4. The power supply of claim 3 wherein:
   said first end of said zener diode and said third ends of said pair of diodes are anodes.

* * * * *

UNITED STATES PATENT OFFICE
CERTIFICATE OF CORRECTION

Patent No. 3,629,682  Dated December 21, 1971

Inventor(s) Donald A. Boelter

It is certified that error appears in the above-identified patent and that said Letters Patent are hereby corrected as shown below:

Column 2, line 47 change "zener diode 40" to
--zener diode 40'--

Column 2, line 72 change "zener diode 40" to
--zener diode 40'--

Signed and sealed this 13th day of June 1972.

(SEAL)
Attest:

EDWARD M. FLETCHER, JR.
Attesting Officer

ROBERT GOTTSCHALK
Commissioner of Patents